United States Patent Office 2,813,133
Patented Nov. 12, 1957

2,813,133
PREPARATION OF 2,2-BIS(CHLOROMETHYL)-4-METHYL-4-PHENYLPENTANE

Louis Schmerling, Riverside, Ill., assignor to Universal Oil Products Company, Des Plaines, Ill., a corporation of Delaware No Drawing. Application September 4, 1953, Serial No. 378,659

5 Claims. (Cl. 260—651)

This invention relates to new compositions of matter comprising dihaloalkyl aromatic compounds of a certain structure and a method for preparing the same. More particularly this invention relates to a process for preparing new compositions of matter comprising 2,2-bis(chloromethyl)-4-methyl-4-arylpentanes.

The object of this invention is to prepare new compositions of matter comprising dihaloalkyl aromatic compounds.

A further object of this invention is to prepare new compositions of matter comprising dihalooctyl aromatic compounds and particularly dichlorooctyl aromatic compounds such as 2,2 - bis(chloromethyl) - 4 - methyl - 4-arylpentanes.

One embodiment of this invention relates to a process for the preparation of a dihaloalkyl aromatic compound by condensing a dihaloalkene of a certain structure with an aromatic hydrocarbon in the presence of an acid acting condensation catalyst.

A further embodiment of this invention relates to a process for the preparation of a dihaloalkyl aromatic compound by condensing the dimer of a β-alkylallyl halide with an aromatic compound in the presence of an acid acting condensation agent.

Another embodiment of this invention resides in the process for the preparation of a dichlorooctyl aromatic compound by condensing a dichlorooctene with an aromatic hydrocarbon in the presence of an acid acting condensation catalyst.

A specific embodiment of this invention resides in the preparation of a dichlorooctyl aromatic hydrocarbon such as a dichloromethyl-methyl-phenylpentane by condensing a dichlorooctene with an aromatic hydrocarbon such as benzene in the presence of an acid acting condensation catalyst.

A still more specific embodiment of this invention resides in the preparation of 4,4-bis(chloromethyl)-4-methyl-4-phenylpentane by condensing 4,4-bis(chloromethyl)-2-methyl-1-pentene with benzene in the presence of sulfuric acid at temperatures ranging from about —10° C. to about 50° C.

Other objects and embodiments of this invention relating to alternative dihalooctyl compounds and to alternative aromatic hydrocarbons which may be used will be referred to in the following further detailed description of this invention.

It has now been discovered that dichlorooctyl aromatic compounds which are useful as intermediates in the preparation of resins, plastics, pharmaceuticals, insecticides and in the synthesis of other organic compounds may be prepared by condensing a dichlorooctene with an aromatic hydrocarbon.

The dihalooctenes which are condensed with the aromatic hydrocarbon to form the dihalooctyl aromatic compounds are prepared by dimerizing a haloalkenyl compound having the following formula:

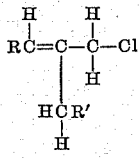

in which R and R' are independently selected from the group consisting of hydrogen or saturated alkyl or cycloalkyl radicals. In the preferred embodiment of this invention this haloalkenyl compound comprises methallyl chloride although other unsaturated haloalkenyl compounds such as ethallyl chloride, butallyl chloride, 1-chloro - 2 - methyl - 2 - butene, 1 - chloro - 2 - methyl - 2-pentene, 1 - chloro - 2 - ethyl - 2 - butene, 1 - chloro - 2-ethyl - 2 - pentene, 1 - chloro - 2 - butyl - 2 - pentene, etc. may also be used. It is also contemplated within the scope of this invention that the chloride atom in the haloalkenyl compound may be replaced by a bromine atom, although not necessarily with equivalent results. The dimerization of the haloalkenyl compounds takes place in the presence of peroxide catalysts which may include dimethyl peroxide, diethyl peroxide, di-tert-butyl peroxide, dipropyl peroxide, acetyl benzyl peroxide, acetyl peroxide, propionyl peroxide, butyryl peroxide, benzoyl peroxide, tetralin peroxide, urea peroxide, etc.

The dihaloalkenes produced by the dimerization of the haloalkenyl compound have the following formula:

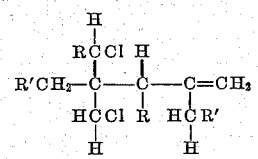

in which R and R' are independently selected from the group consisting of hydrogen or saturated alkyl or cycloalkyl radicals.

When the haloalkenyl compound which, in the preferred embodiment of the invention as hereinbefore stated, comprises methallyl chloride, is dimerized, the result is 4,4-bis(chloromethyl) - 2 - methyl - 1 - pentene. When this dichlorooctene is condensed with an aromatic hydrocarbon in the presence of an acid acting condensation catalyst the resultant compound comprises a 2,2 - bis(chloromethyl)-4-methyl-4-arylpentane. Aromatic compounds which may be condensed with the dimerized haloalkenyl compounds include benzene, naphthalene, anthracene, pyrene, phenanthrene, chrysene, triphenylene, etc. Alkyl benzenes such as toluene, xylene, trimethylbenzene, ethylbenzene, propylbenzene, diethylbenzene, dipropylbenzene, α - methylnaphthalene, α - ethylnaphthalene, β - ethylnaphthalene, etc., methylpyrene, ethylpyrene, propylpyrene, etc., methylanthracene, ethylanthracene, etc. may also be used. Substituted aromatic compounds such as hydroxybenzenes, halobenzenes, and alkoxybenzenes may also be condensed with the dihaloalkenes.

The condensation of the aromatic compound and the dimerized haloalkenyl compound is catalyzed by sulfuric acid, hydrogen fluoride, and phosphoric acid.

The temperature under which the process of the present invention will proceed is dependent upon the particular reactants and the type of catalyst used in the process. For example, when active catalysts such as sulfuric acid or hydrogen fluoride are used, the temperature of the reaction will range from about —10° C. to about 50° C. or more; with less active catalysts such as phosphoric acid, the temperature range will be correspondingly higher in the scale and will range from about 25° C. to about 300° C. or more.

The process of the present invention may be carried out in any suitable manner and may be either a batch or continuous type of operation. When a batch type operation is used, the quantity of the reactants, namely, the dimerized haloalkenyl compound and the aromatic hydrocarbon are placed in a reactor equipped with a mixing device. The acid acting condensation catalyst is also added and the mixture is continuously stirred for a predetermined period of time. When a strong catalyst is used, the reactor is maintained at a low temperature; however, when a less active catalyst is used, the reaction vessel is heated to the desired temperature. When the reaction time has been completed, the desired condensation product is recovered from the unreacted starting materials and the catalyst by conventional means, for example, by fractional distillation.

Another method of operation of the present process, which constitutes the preferred method of operation, is of the continuous type. In this method of operation the desired dimerized haloalkenyl compound, the aromatic hydrocarbon and the catalyst are continually charged to a reaction zone maintained at a suitable operating condition of temperature and pressure. The reaction zone may be an unpacked vessel or coil, or it may contain an absorbent packing material such as firebrick, alumina, dehydrated bauxite and the like. The condensation product is separated from the reactor effluent, while the unconverted materials may be recycled through the reaction zone to form a portion of the starting material. A particularly suitable type of continuous operation, when the acid acting condensation catalyst is solid, comprises a fixed bed type in which the catalyst is disposed as one or more beds in the reaction zone and the dimerized haloalkenyl compound and the aromatic hydrocarbon are passed through in either an upward or downward flow. Another continuous type of process is the fluidized bed type of operation in which the reactants and the condensation catalyst are maintained in a state of turbulence under hindered settling conditions in the reaction zone. Other continuous type of processes include the compact moving bed type of operation in which the condensation catalyst and the reactants are passed either concurrently or countercurrently to each other. Still another type of continuous process is the slurry type process in which the condensation catalyst is carried into the reaction zone as a slurry in the aromatic hydrocarbon. In each of the aforementioned type of processes the unreacted material may be separated out and recycled for use as a portion of a feed material while the desired condensation product is withdrawn.

The following examples are given to illustrate the process of the invention, which, however, are not intended to limit the generally broad scope of the present invention in strict accordance therewith.

*Example I*

100 grams of benzene and 80 grams of concentrated sulfuric acid were placed in a reaction vessel equipped with stirring means. External cooling means were applied to the vessel which was maintained at a temperature of 1° C. 60 grams of 4,4-bis(chloromethyl)-2-methyl-1-pentene dissolved in 80 g. of benzene were slowly added during a period of three hours. During this time the mixture was continuously stirred. At the end of this time the organic upper layer was separated from the 80 g. of catalyst layer, was washed, dried and subjected to distillation under reduced pressure. The condensation product boiled at 139° C. at 2.7 mm. pressure (320° C. at 760 mm.) and had a refractive index of $n_D^{20}=1.5331$. The formula of the condensation product, namely 2,2-bis(chloromethyl)-4-methyl-4-phenylpentene was verified by its analysis.

Calculated for $C_{14}H_{20}Cl_2$: C, 64.86; H, 7.78; Cl, 27.36. Found: C, 64.72; H, 7.70; Cl, 27.28.

*Example II*

A solution of one molecular proportion of 4,4-bis(chloromethyl)-2-methyl-1-pentene dissolved in two molecular proportions of ethylbenzene is added to a mixture of two molecular proportions of ethylbenzene and about four molecular proportions of hydrogen fluoride. The temperature is maintained at approximately 0° C. for a period of approximately three hours. At the end of this time the organic layer is separated from the catalyst layer, is washed, dried and distilled under reduced pressure in a manner similar to that set forth in Example I. The desired condensation product is 2,2-bis(chloromethyl)-4-methyl-4-(p-ethylphenyl)pentane.

I claim as my invention:

1. A process for the preparation of a dichlorooctyl aromatic compound which comprises condensing 4,4-bis(chloromethyl)-2-methyl-1-pentene with an aromatic hydrocarbon in the presence of an acid condensation catalyst selected from the group consisting of sulfuric acid, phosphoric acid and hydrogen fluoride.

2. A process for the preparation of a dichlorooctyl aromatic compound which comprises condensing 4,4-bis(chloromethyl)-2-methyl-1-pentene with an aromatic hydrocarbon in the presence of an acid condensation catalyst selected from the group consisting of sulfuric acid, phosphoric acid and hydrogen fluoride at temperatures ranging from about —10° C. to about 300° C.

3. A process for the preparation of a dichlorooctyl aromatic compound which comprises condensing 4,4-bis(chloromethyl)-2-methyl-1-pentene with an aromatic hydrocarbon in the presence of sulfuric acid at temperatures ranging from about —10° C. to about 50° C.

4. A process for the preparation of a dichlorooctyl aromatic compound which comprises condensing 4,4-bis(chloromethyl)-2-methyl-1-pentene with an aromatic hydrocarbon in the presence of hydrogen fluoride at temperatures ranging from about —10° C. to about 50° C.

5. A process for the preparation of 2,2-bis(chloromethyl)-4-methyl-4-phenylpentane which comprises condensing 4,4-bis(chloromethyl)-2-methyl-1-pentene with benzene in the presence of sulfuric acid at a temperature of about 0° C.

References Cited in the file of this patent

UNITED STATES PATENTS 2,485,017    Schmerling _____ Oct. 18, 1949